(12) United States Patent
Chen et al.

(10) Patent No.: US 12,226,832 B2
(45) Date of Patent: Feb. 18, 2025

(54) POWDER CORE-SHELL STRUCTURES AND METHODS THEREFOR

(71) Applicant: Wisconsin Alumni Research Foundation, Madison, WI (US)

(72) Inventors: Lianyi Chen, Madison, WI (US); Jiandong Yuan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 64 days.

(21) Appl. No.: 17/872,453

(22) Filed: Jul. 25, 2022

(65) Prior Publication Data

US 2024/0024951 A1 Jan. 25, 2024

(51) Int. Cl.
| | |
|---|---|
| *B22F 7/08* | (2006.01) |
| *B22F 3/03* | (2006.01) |
| *B22F 3/18* | (2006.01) |
| *B22F 3/20* | (2006.01) |
| *B22F 5/12* | (2006.01) |

(52) U.S. Cl.
CPC ............... *B22F 7/08* (2013.01); *B22F 3/03* (2013.01); *B22F 3/18* (2013.01); *B22F 3/20* (2013.01); *B22F 5/12* (2013.01); *B22F 2304/10* (2013.01)

(58) Field of Classification Search
CPC ...... B22F 7/08; B22F 3/03; B22F 3/18; B22F 3/20; B22F 5/12; B22F 2304/10; B22F 10/25; B22F 2009/043; B22F 1/148; B33Y 70/10; B33Y 70/00
USPC .............................................................. 419/4
See application file for complete search history.

(56) References Cited

U.S. PATENT DOCUMENTS

| | | | | |
|---|---|---|---|---|
| 4,906,609 | A | * | 3/1990 | Yamauchi .......... H10N 60/0801 427/63 |
| 2003/0036482 | A1 | * | 2/2003 | Thieme ............. H10N 60/0856 505/100 |
| 2008/0093350 | A1 | * | 4/2008 | Ma ..................... B23K 35/0227 427/446 |
| 2014/0100118 | A1 | * | 4/2014 | Doll ..................... H10N 60/202 505/231 |

OTHER PUBLICATIONS

Industrial Metal Supply Co., What is the Difference Between Metal Sheet, Plate, and Foil? Mar. 18, 2021 (Year: 2021).*

* cited by examiner

*Primary Examiner* — Brian D Walck
*Assistant Examiner* — Danielle Carda
(74) *Attorney, Agent, or Firm* — Crawford Maunu PLLC

(57) ABSTRACT

Aspects of the disclosure are directed to metal-based materials, their manufacture and their use. Certain embodiments involve providing powder in a metal-based foil/shell, and forming a tube from the foil/shell with the powder therein. The tube thus has a metal-based foil shell filled with the powder. Metal wire may be formed by rolling the tube filled with the powder and reducing the diameter of the tube. Certain embodiments are directed to the structure of such a tube prior to wire formation, and other embodiments are directed to the metal wire itself.

14 Claims, 3 Drawing Sheets

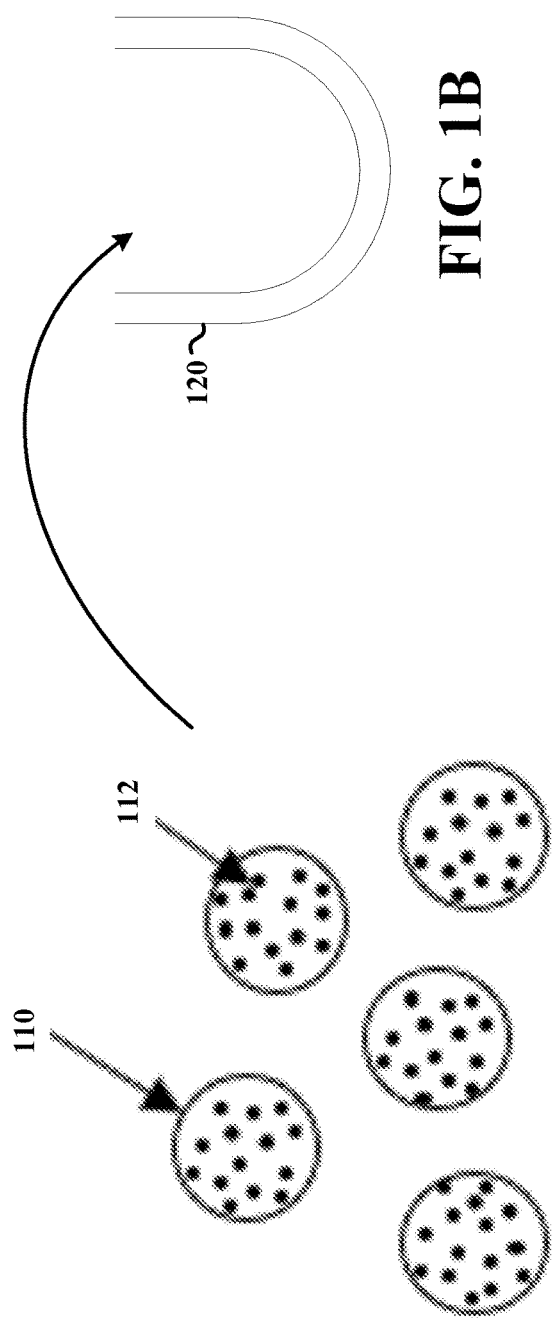
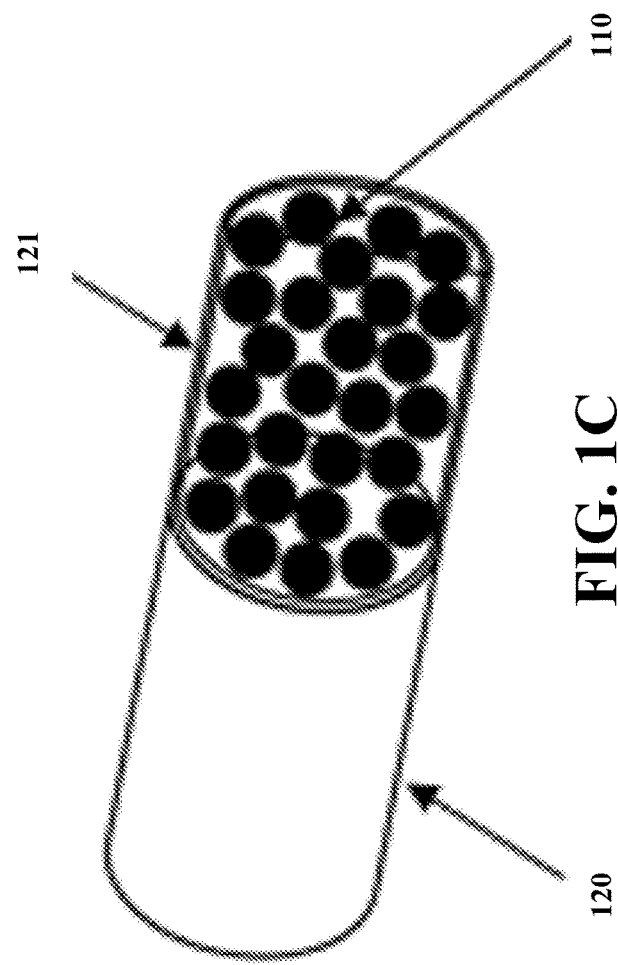
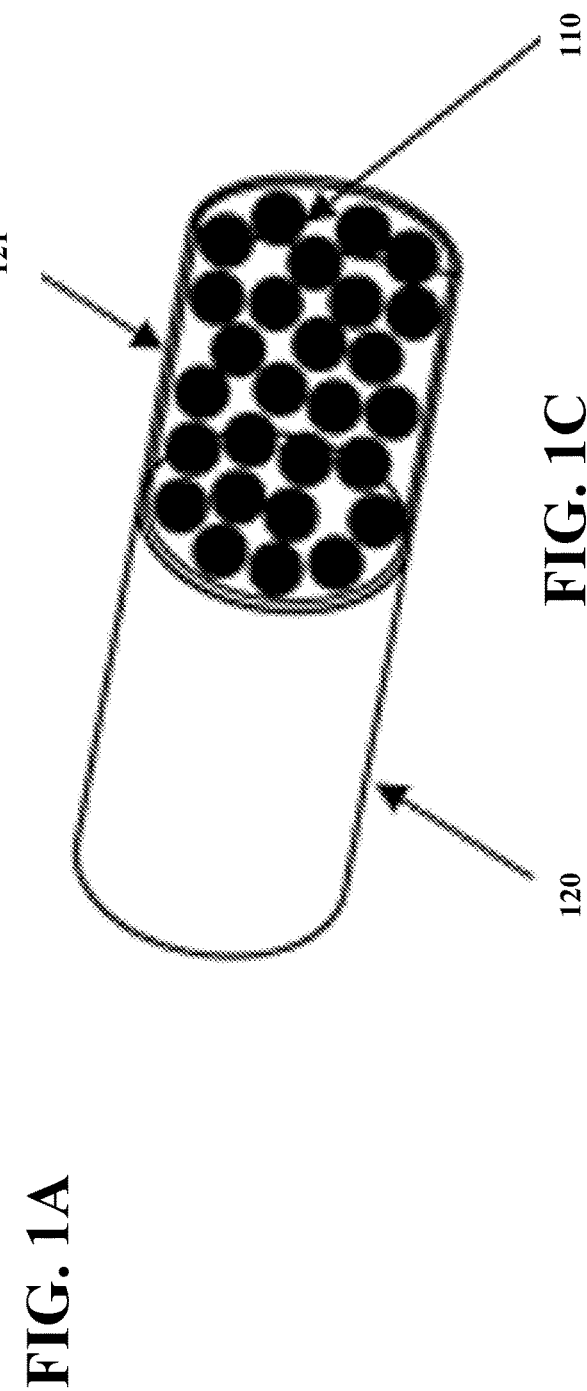

POWDER CORE-SHELL STRUCTURES AND METHODS THEREFOR

BACKGROUND

A variety of metal-based materials utilize small particles and particulates, such as by utilizing nanoparticles. For instance, metal matrix nanocomposite (MMNC) materials are a class of materials exhibiting useful mechanical, physical, and chemical properties. However, the lack of technology for large-scale production of MMNCs has hindered the rapid development and application of MMNCs. For instance, high surface energy associated with nanoparticles may result in such nanoparticles forming in clusters within liquid metals. Such clusters may inhibit the ability to form structures with uniform characteristics.

As a specific example, MMNCs ingots may be formed by ultrasonic-assisted solidification processing. However, aggregation and clustering of nanoparticles in liquid metals may occur after sonication is turned off. This may present a challenge for manufacturing metal matrix nanocomposites in large scale. As other examples, ball milling and powder metallurgy, electrochemical deposition, rapid solidification, and laser bed powder fusion may be utilized to fabricate MMNCs. However, these methods may be limited in size/volume. Further, many powder-based processes require utilization of a chamber, which may limit processing volume.

These and other matters have presented challenges to the manufacture of MMNCs for a variety of applications, such as those applications in which the volume fraction of nanoparticle reinforcement is high.

SUMMARY

Various example embodiments are directed to metal-based structures using a core/powder type structure, their application, and their manufacture. Such embodiments may be useful for large-scale manufacture of MMNCs, for instance in core-shell metal matrix nanocomposite wire formation as may be utilized for directed energy deposition (DED) additive manufacturing, and otherwise addressing one or more challenges such as those noted above.

As may be implemented in accordance with one or more embodiments, a method involves depositing powder onto a metal-based foil (or otherwise providing the powder thereon). A tube is formed from the foil and the powder is enclosed within the tube, with the tube having a metal-based foil shell filled with the powder. Metal wire is formed by rolling or extruding the tube filled with the powder and reducing the diameter of the tube.

Another embodiment is directed to an apparatus comprising metal-based powder and metal-based foil enclosing the powder within. The foil and enclosed powder are configured to operate in an unrolled state in which the foil has a first diameter and the powder has a first density. In response to rolling of the foil, the foil and powder are further configured to convert to a rolled wire in which the foil has a second diameter that is less than the first diameter and in which the powder has a second density that is higher than the first density.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIG. 1A shows powder particles with particulates, as may be implemented in accordance with one or more embodiments;

FIG. 1B shows a metal foil in a U shape for accepting powder, such as the powder of FIG. 1A, as may be implemented in accordance with one or more embodiments;

FIG. 1C shows metal foil with the powder of FIG. 1A inside, as may be formed by providing the powder in the U-shaped foil of FIG. 1B and forming the foil into a tube, and as may be implemented in accordance with one or more embodiments;

Figure 2:
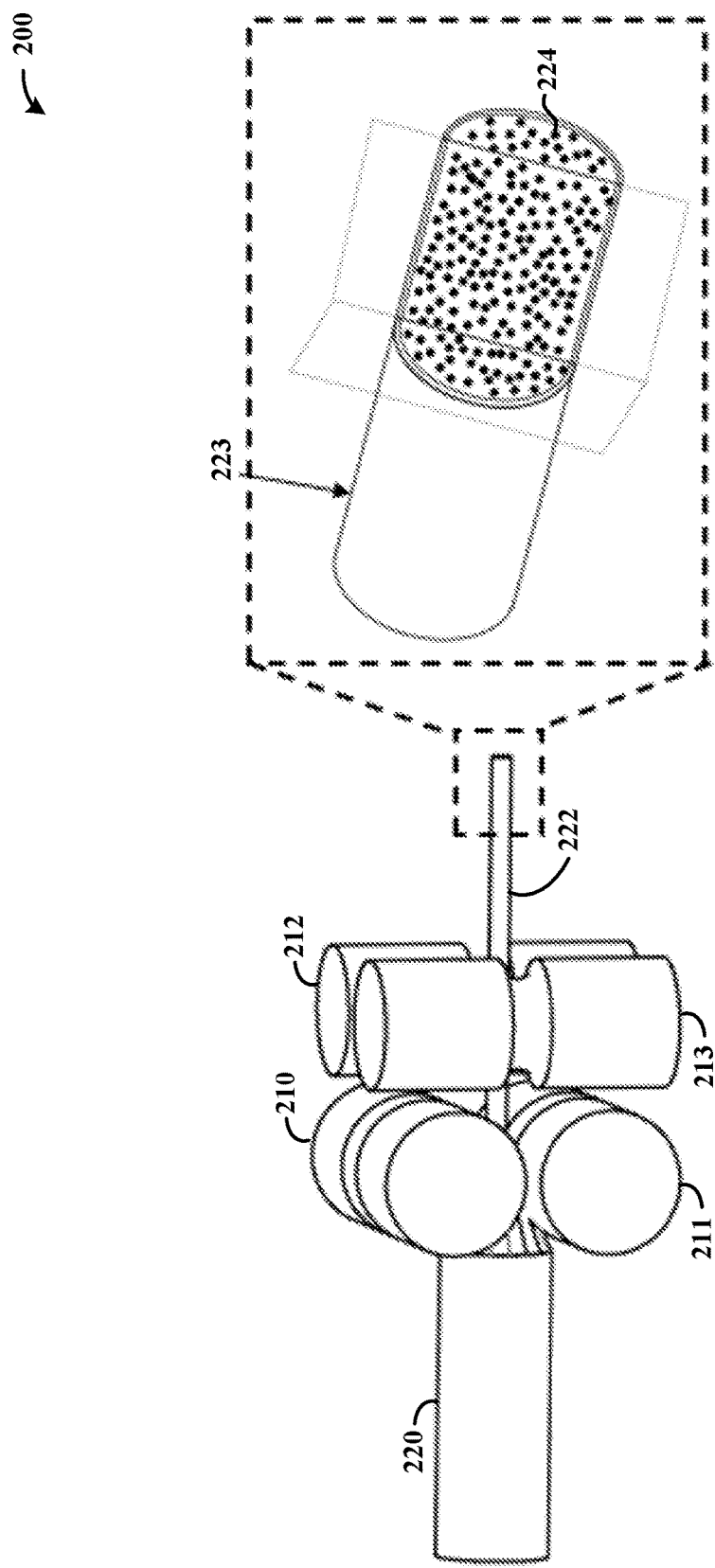
FIG. 2 shows an apparatus and approach for manufacturing wire, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving metal-based powders, as may be utilized within a foil or shell. In certain implementations, aspects of the present disclosure have been shown to be beneficial when used in the context of the formation of metal wire, by compressing a metal-based foil having metal-based powders therein. These powders may include powder particles each having a plurality of particulates therein, such as a metal powder having nanoparticles therein, which may be readily and evenly dispersed upon compression (e.g., rolling, extruding) of the foil to form wire. Further, it has been recognized/discovered that such wire formation may be carried out entirely or nearly entirely in the solid state, without necessarily forming liquid. Such metal wire may be useful in a variety of applications, such as in DED additive manufacturing, aerospace, energy (e.g., turbine blades, fusion systems), and military applications. Powders useful in such approaches can be metals and/or alloys, and the powders may be made up of nanoparticles such as ceramics, metals, alloys and a combination thereof. While not necessarily so limited, various aspects may be appreciated through a discussion of examples using such exemplary contexts.

According to various example embodiments, core-shell metal matrix nanocomposite wire is produced by uniformly depositing nanoparticles in a core of a core-shell wire. The volume fraction and/or composition of nanoparticles in the wire may be set to suit particular applications. Such a wire may be formed as a core-shell MMNC wire, which may be safely and effectively used in large-scale additive manufacturing and welding of MMNCs.

In a particular embodiment, a core-shell MMNC wire is manufactured as follows. Powder having dispersed nanoparticles is produced using ball milling. A U-shape metallic foil is produced using, for example, a rolling process, and the powder is provided within the U shape (concave portion) of the metallic foil. The metallic foil is closed to form a tube-like shape, such as by rolling or other metal processing approach. The resulting powder-filled foil is reduced in diameter, for instance by rolling. Accordingly, a core-shell MMNC wire may be formed and the resulting wire may be used for a variety of applications, such as for DED additive manufacturing.

In connection with these approaches, it has been recognized/discovered that providing powder in a shell as characterized herein can address challenges relating to flying/moving powder (and any related safety issues therewith). For instance, wire-based DED additive manufacturing may eliminate flying powders in the process. It has further been recognized/discovered that providing the powder in a shell facilitates powder-based additive manufacturing techniques that would otherwise require a chamber system (e.g., to control the oxygen content) that may limit the sample size and processing efficiency, by processing in a shielding gas (e.g., inert gas) so as sample size may not be limited and efficiency is improved.

Various embodiments are directed to forming metal wire. In a particular embodiment, powder is deposited onto a metal-based foil and a tube is formed from the foil and enclosing the powder within the tube. This forms a tube having a metal-based foil shell filled with the powder. Metal wire is formed by rolling or extruding the tube filled with the powder, and reducing the diameter of the tube. This approach may involve compressing the powder and eliminating gaps between respective particles of the powder.

The powder may be deposited in a variety of manners. For instance, the metal-based foil may be formed in a U shape having a concave surface, and the powder may be deposited on the concave surface. The U-shaped metal-based foil may be closed around the deposited powder to form the tube. As another example, the tube maybe formed having the metal-based foil shell with particles of the powder evenly distributed within the metal-based foil shell along the length of the tube.

The powder may include powder particulates, in which each powder particulate has a plurality of particles therein that may exhibit a variety of characteristics, and may be formed in a variety of manners such as via ball milling. For instance, the particles in each powder particulate may include particles selected from the group consisting of nanoparticles, microparticles, and a combination thereof. The particulates may have a cross-section between 20 μm and 100 μm in length, and the particles within each powder particulate have a cross-section between 5 nm and 10 μm in length.

The metal wire may be formed in a variety of manners. For instance, the metal wire may be rolled or extruded while maintaining the foil and powder in a solid state. This approach may further involve evenly dispersing the powder within the foil, therein forming the metal wire having the powder evenly dispersed therein with a density of powder that varies less than 20% along the entire length of the metal wire. For instance, particles of the powder between 5 nm and 10 μm in length may be evenly distributed, such that more than 50% of the particles are separated by a distance of more than 1 nm.

Various embodiments are directed to an apparatus and/or article of manufacture involving metal wire and/or a metal wire precursor (e.g., at an intermediate stage of manufacture). One such embodiment involves a metal-based powder and a metal-based foil enclosing the powder within. The foil and enclosed powder are configured to operate in an unrolled/unextruded state in which the foil has a first diameter and the powder has a first density. In response to rolling or extruding of the foil, the foil and enclosed powder are configured to convert to a rolled/extruded wire in which the foil has a second diameter that is less than the first diameter, and in which the powder has a second density that is higher than the first density. The foil and enclosed powder may be configured to convert permanently to the rolled/extruded wire in response to the rolling or extruding of the foil. The powder in the unrolled/unextruded state may gaps between respective particles of the powder, in which instance the gaps in the formed wire tube are smaller in volume. The foil may be a U-shaped foil closed around the powder in a tubular shape in the unrolled/unextruded state.

The powder may include powder particulates, each powder particulate having a plurality of particles therein. The particles may be selected from the group consisting of: nanoparticles, microparticles, and a combination thereof. The powder particulates may have a cross-section between 20 μm and 100 μm in length, and the particles within each powder particulate may have a cross-section between 5 nm and 10 μm in length. The powder may be evenly distributed along the length of the foil. Further, the powder and foil may be provided in a solid state in both the unrolled state and in the form of the rolled wire.

Turning now to the figures, FIG. 1A shows powder particles 110 with particulates 112 therein, as may be implemented in accordance with one or more embodiments. The particulates 112 may be uniformly dispersed within each powder particle, a plurality of which may make up metallic powder. The particulates may include or consist of nanoparticles, with properties useful for a variety of applications.

FIG. 1B shows a metal foil 120 in a U shape for accepting powder, such as the powder particles 110 of FIG. 1A, as may be implemented in accordance with one or more embodiments. The metal foil 120 may be formed from a variety of materials, to suit particular applications, and into other shapes amenable to the addition of powder therein, as depicted by the arrow.

FIG. 1C shows metal foil 120 with the powder of FIG. 1A inside as shown in cutaway portion 121, as may be implemented in accordance with one or more embodiments. The metal foil 120 may be formed using the U-shaped foil of FIG. 1B, with the foil being closed (e.g., rolled) into a tube holding the powder therein. A plurality of the powder particles are depicted within the metal foil 120.

FIG. 2 shows an apparatus 200 and approach for manufacturing wire, in accordance with various embodiments. The apparatus 200 includes rollers 210, 211, 212 and 213, which are operable to compress a metal foil 220 filled with a powder as discussed herein, to form metal wire 222. By way of example, this may involve forming metal wire as shown in the inset with an outer shell 223 and a plurality of particulates 224 therein as depicted with a cutaway view.

Figure 3:
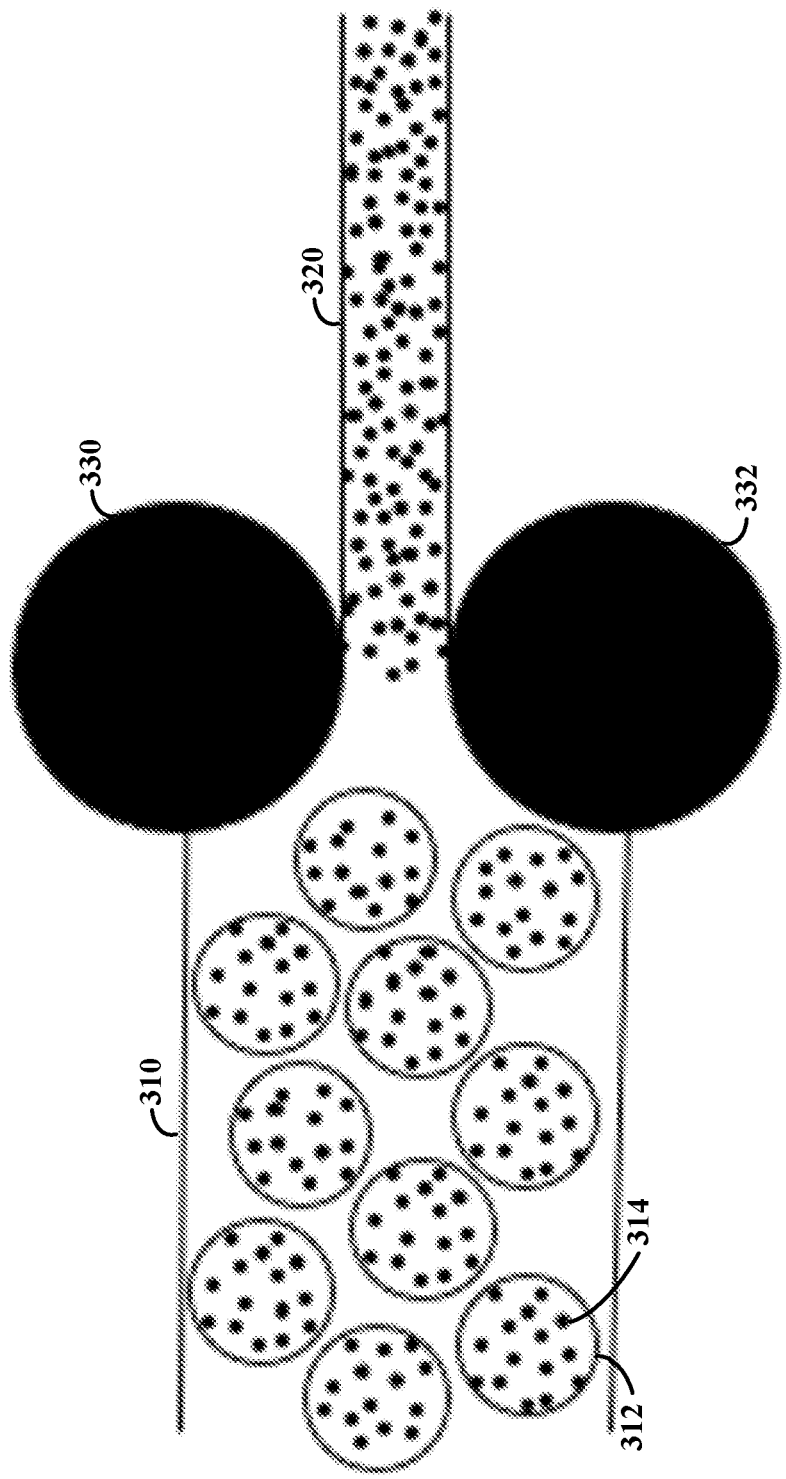
FIG. 3 shows a metal foil tube being rolled into a metal wire, as may be implemented in accordance with one or more embodiments.

FIG. 3 shows a metal foil tube 310 being rolled into a metal wire 320, as may be implemented in accordance with one or more embodiments. The metal foil tube 310 has powder therein, including a plurality of powder particles 312, each having particulates 314 dispersed therein. The metal foil tube 310 is passed through rollers 330 and 332, which compress the metal foil tube into the metal wire 320.

This compression reduces the diameter of the metal foil tube 310, and may also reduce spacing between the powder particulates. This compression may further reduce spacing between the particulates. In some instances, the powder particles are broken up such that the resulting composition of the metal wire 320 is that of the particulates (e.g., the powder particles may no longer be intact).

Based upon the above discussion and illustrations, those skilled in the art will readily recognize that various modifications and changes may be made to the various embodiments without strictly following the exemplary embodiments and applications illustrated and described herein. For example, various other shapes and sizes of powders and/or particulates may be used. Further, other compression/extrusion techniques may be used. Some embodiments are directed toward additive manufacturing in which metal wire is formed as characterized herein and utilized to produce an additive manufacturing structure. Such modifications do not depart from the true spirit and scope of various aspects of the invention, including aspects set forth in the claims.

What is claimed is:

1. A method comprising:
    forming solid microscale powder particulates, each powder particulate consisting of a plurality of nanoparticles evenly dispersed therein;
    depositing the powder particulates onto a metal-based foil;
    forming a tube from the foil and enclosing the powder particulates within the tube, therein forming the tube having a metal-based foil shell filled with the powder particulates; and
    forming metal wire with dispersed nanoparticles by rolling or extruding the tube filled with the powder particulates and reducing the diameter of the tube.

2. The method of claim 1, wherein forming the metal wire includes compressing the powder particulates and eliminating gaps between respective nanoparticles therein.

3. The method of claim 1, wherein:
    depositing the powder particulates onto the metal-based foil includes forming the metal-based foil in a U shape having a concave surface and depositing the powder particulates on the concave surface; and
    forming the tube includes closing the U-shaped metal-based foil around the deposited powder particulates.

4. The method of claim 1, wherein the powder particulates have a cross-section between 20 µm and 100 µm in length, and the nanoparticles within each powder particulate have a cross-section between 5 nm and 10 µm in length.

5. The method of claim 1, further including forming the powder particulates via ball milling.

6. The method of claim 1, wherein forming the metal wire by rolling or extruding the tube filled with the powder particulates and reducing the diameter of the tube includes maintaining the foil and powder particulates in a solid state.

7. The method of claim 6, wherein forming the metal wire while maintaining the foil and powder particulates in a solid state includes evenly dispersing the powder particulates within the foil and therein forming the metal wire having the powder evenly dispersed therein with a density of powder that varies less than 20% along the entire length of the metal wire.

8. An apparatus comprising:
    metal-based powder particulates consisting of a plurality of nanoparticles evenly dispersed therein; and
    a metal-based foil enclosing the powder within, the foil and enclosed powder being configured to:
        operate in an unrolled/unextruded state in which the foil has a first diameter and the powder has a first density, and
        in response to rolling or extruding of the foil, convert to a rolled or extruded wire in which the foil has a second diameter that is less than the first diameter and in which the powder has a second density that is higher than the first density.

9. The apparatus of claim 8, wherein the foil and enclosed powder particulates are configured to permanently convert to the wire in response to the rolling or extruding of the foil.

10. The apparatus of claim 8, wherein the powder particulates in the unrolled/unextruded state include gaps between respective nanoparticles of the powder particulates, and wherein the gaps in the wire are smaller in volume.

11. The apparatus of claim 8, wherein the foil is a U-shaped foil closed around the powder particulates in a tubular shape.

12. The apparatus of claim 8, wherein the powder particulates have a cross-section between 20 µm and 100 µm in length, and the nanoparticles within each powder particulate have a cross-section between 5 nm and 10 µm in length.

13. The apparatus of claim 8, wherein the foil has a length and wherein the powder particulates are evenly distributed along the length of the foil.

14. The apparatus of claim 8, wherein the powder particulates and foil are in a solid state in both the unrolled state and in the form of the wire.

\* \* \* \* \*